United States Patent
Breu

(10) Patent No.: US 9,187,067 B2
(45) Date of Patent: Nov. 17, 2015

(54) MOTOR VEHICLE WITH DRIVER ASSISTANCE SYSTEM

(75) Inventor: Alexander Breu, Weiding (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 13/455,739

(22) Filed: Apr. 25, 2012

(65) Prior Publication Data
US 2013/0110369 A1     May 2, 2013

(30) Foreign Application Priority Data
Apr. 26, 2011   (DE) .................. 10 2011 018 580

(51) Int. Cl.
| | |
|---|---|
| G06F 7/70 | (2006.01) |
| G06F 19/00 | (2011.01) |
| G06G 7/00 | (2006.01) |
| G06G 7/76 | (2006.01) |
| B60T 7/12 | (2006.01) |
| B60T 7/04 | (2006.01) |
| B60W 30/18 | (2012.01) |
| B60W 30/182 | (2012.01) |
| B60W 50/08 | (2012.01) |

(Continued)

(52) U.S. Cl.
CPC . *B60T 7/12* (2013.01); *B60T 7/042* (2013.01); *B60W 30/17* (2013.01); *B60W 30/182* (2013.01); *B60W 30/18027* (2013.01); *B60W 30/18036* (2013.01); *B60W 30/18109* (2013.01); *B60W 50/082* (2013.01); *B60T 2201/022* (2013.01); *B60T 2201/03* (2013.01); *B60W 2050/0026* (2013.01); *B60W 2050/0073* (2013.01); *B60W 2050/0074* (2013.01); *B60W 2510/186* (2013.01); *B60W 2520/10* (2013.01); *B60W 2540/04* (2013.01); *B60W 2540/12* (2013.01); *B60W 2540/16* (2013.01); *B60W 2550/10* (2013.01); *B60W 2710/182* (2013.01); *B60W 2720/106* (2013.01)

(58) Field of Classification Search
CPC ..... B60T 7/042; B60T 7/12; B60T 2201/022; B60T 2201/03; B60W 30/17; B60W 30/18027; B60W 30/18036; B60W 30/18109; B60W 30/182; B60W 50/082; B60W 2050/0026; B60W 2050/0073; B60W 2050/0074; B60W 2510/186; B60W 2520/10; B60W 2540/04; B60W 2540/12; B60W 2540/16; B60W 2550/10; B60W 2710/182; B60W 2720/106
USPC .......................................................... 701/70
See application file for complete search history.

(56) References Cited

U.S. PATENT DOCUMENTS 3,541,881 A * 11/1970 Pharis .............................. 74/512
6,459,982 B1 * 10/2002 Kobayashi et al. ............. 701/93

(Continued)

FOREIGN PATENT DOCUMENTS

| DE | 100 06 682 A1 | 10/2001 |
| DE | 100 52 816 | 5/2002 |

(Continued)

*Primary Examiner* — Calvin Cheung
*Assistant Examiner* — Paula L Schneider
(74) *Attorney, Agent, or Firm* — Henry M. Feiereisen, LLC

(57) ABSTRACT

A motor vehicle includes a driver assistance system which is rendered operative when the motor vehicle travels below a limit speed to automatically brake the motor vehicle to a halt while moving forward or backing up. The deceleration characteristic can be predefined or can be selected from an array of deceleration characteristics in dependency on an operating behavior of an accelerator pedal.

11 Claims, 1 Drawing Sheet

(51) Int. Cl.
*B60W 30/17* (2012.01)
*B60W 50/00* (2006.01)

(56) References Cited

U.S. PATENT DOCUMENTS

| | | |
|---|---|---|
| 6,502,908 B1 | 1/2003 | Mueller et al. |
| 7,706,954 B2 | 4/2010 | Michi et al. |
| 7,848,859 B2 | 12/2010 | Homeyer et al. |
| 2008/0190681 A1 | 8/2008 | Mayser et al. |
| 2009/0240413 A1* | 9/2009 | Miyajima et al. ............ 701/70 |
| 2012/0018240 A1* | 1/2012 | Grubaugh et al. ........... 180/273 |

FOREIGN PATENT DOCUMENTS

| | | |
|---|---|---|
| DE | 101 05 749 A1 | 8/2002 |
| DE | 103 58 227 A1 | 7/2005 |
| DE | 102008027120 | 12/2009 |
| EP | 1 442 915 | 8/2004 |
| EP | 1 867 853 | 12/2007 |
| EP | 2 116 439 | 11/2009 |

* cited by examiner

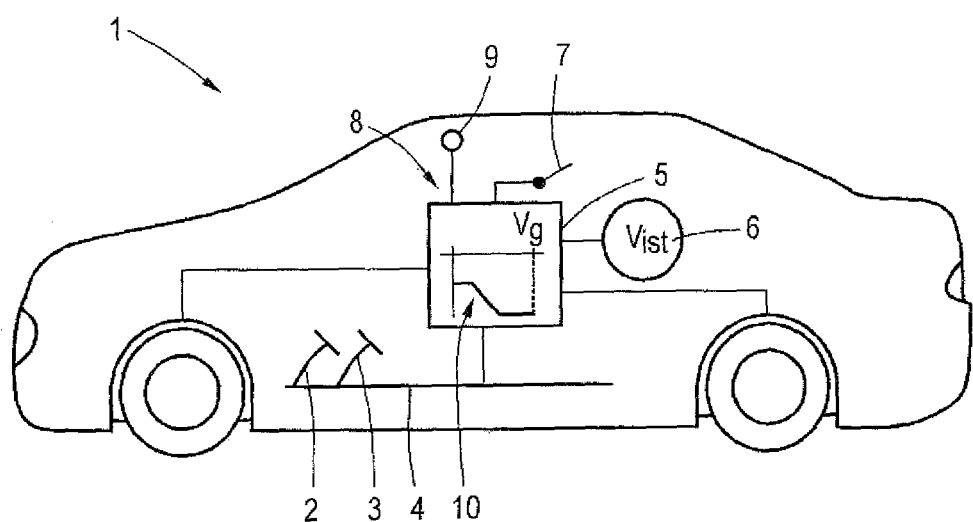

MOTOR VEHICLE WITH DRIVER ASSISTANCE SYSTEM

CROSS-REFERENCES TO RELATED APPLICATIONS

This application claims the priority of German Patent Application, Serial No. 10 2011 018 580.1, filed Apr. 26, 2011, pursuant to 35 U.S.C. 119(a)-(d), the content of which is incorporated herein by reference in its entirety as if fully set forth herein.

BACKGROUND OF THE INVENTION

The present invention relates to a motor vehicle with a driver assistance system.

The following discussion of related art is provided to assist the reader in understanding the advantages of the invention, and is not to be construed as an admission that this related art is prior art to this invention.

Driver assistance systems find application in many forms in modern motor vehicles. For example, speed control systems such as the so-called ACC system (ACC=Adaptive Cruise Control) which maintains the speed of the vehicle at a set cruising speed, when no other vehicle is registered in front of the vehicle. When the sensor mechanism detects however a vehicle ahead, the ACC system adapts to the speed of the vehicle ahead by adjusting a time gap or distance previously set by the driver. Conventional ACC systems are also able to actively brake a vehicle to a halt, when the situation of the vehicle ahead demands such an action.

These ACC systems require the presence of a complex sensor technology to be able to properly survey the surroundings and to effectively adapt to the situation at hand. This sensor technology is also needed to assist and relieve the driver, when complex control tasks are involved. However, the use of such an ACC system is inapposite when simple control tasks are concerned that especially involve complete participation by the driver.

It would therefore be desirable and advantageous to provide an improved motor vehicle with a driver assistance system which obviates prior art shortcomings and which is simple in structure and able to execute multiple tasks but yet is reliable in operation.

SUMMARY OF THE INVENTION

According to one aspect of the present invention, a motor vehicle includes a driver assistance system which is rendered operative when the motor vehicle travels below a limit speed to automatically brake the motor vehicle to a halt while moving forward or backing up.

The present invention resolves prior art problems by equipping the motor vehicle with a driver assistance system which can be activated to take over speed control only when the vehicle travels below a limit speed which is predefined by the manufacturer or can be selected by the driver. This limit speed is significantly less than the engine-dependent maximum speed. For example, the limit speed may be set to 60 km/h or 50 km/h. Currently preferred is a limit speed of 40 km/h. In other words, the limit speed is very low, also because the driver assistance system operates in the absence of any signal generated by an environmental sensor. Rather, the driver assistance system, when activated below the limit speed, is set and rendered operative to a work mode or control mode as a result of an activation information by the driver, and is able to decelerate the vehicle automatically according to a deceleration characteristic to ultimately bring the vehicle to a halt while moving forward or backing up. The driver of the motor vehicle is thus compelled to provide the activation signal in time to activate the speed control mode and to initiate the automatic deceleration mode and to thereby stop the vehicle in time before or behind an obstacle. The driver requires only little training as the limit speed is very low to enable the driver assistance system to slow down and ultimately bring the vehicle to a halt so that the driver knows after few attempts the behavior of the vehicle and the length of the deceleration distance in relation to the speed at which the driver triggers the activation signal for the automatic deceleration operation.

This function is available for the driver while moving forward travel or backing up. The provision of the driver assistance system is especially beneficial when backing up because the driver can utilize the driver assistance system during a parking maneuver.

The driver assistance system can be switched off at any time by the driver, even when the vehicle travels below the limit speed and the driver assistance system would theoretically be ready for operation.

According to another advantageous feature of the present invention, the deceleration characteristic may be predefined. In other words, the characteristic is the same for each given speed for which the driver triggers the activation signal, so long as the speed is below the limit speed. It may also be conceivable to select the deceleration characteristic in dependency on an operating behavior of an accelerator pedal from an array of deceleration characteristics. The driver can thus trigger the activation signal using the accelerator pedal to initiate the automatic deceleration mode so long as the actual speed is less than the limit speed. When the accelerator pedal, i.e. the gas pedal, is released sufficiently fast, i.e. a sufficient release gradient is provided, or the accelerator pedal reaches a certain position absolute value, i.e. a position in which the accelerator pedal is not depressed or only slightly depressed, the activation signal is triggered. In dependency thereof, the deceleration characteristic may also be chosen. When the driver releases the accelerator pedal very quickly, i.e. suddenly steps off the gas pedal, this action implies the desire for a slightly greater deceleration compared to a situation in which the driver releases the accelerator pedal more gently. A respective deceleration characteristic may hereby be selected. For example, the array of deceleration characteristics may include three deceleration characteristics, one defining a slow comfortable deceleration, one defining a slightly faster deceleration, and one defining a relatively sudden dynamic deceleration.

According to another advantageous feature of the present invention, the deceleration characteristic can be selected in dependency of an actual speed. Regardless at which actual speed, which is less than the limit speed, the activation signal is triggered, a speed-relating characteristic is chosen. When, for example, triggering the activation signal at a speed which approximates the limit speed, a deceleration characteristic is selected having a greater deceleration at the beginning and gradually decreasing towards the end until coming to a halt. In a scenario in which the actual speed is about half the limit speed for example, a slightly "flatter" characteristic can be selected which involves a substantially even or linear braking action to a halt.

According to another advantageous feature of the present invention, the driver assistance system can be configured to be subordinated to a driver-side actuation of a brake pedal, even when the driver assistance system is activated. In other words, actuation of the brake pedal by the driver is prioritized even though the driver assistance system is operational. Thus, the driver is in charge of the speed control and is thus able to override the operation of the driver assistance system when depressing the brake pedal. The action by the driver is prioritized at all times.

When the driver briefly taps on the brake pedal while the driver assistance system is active and then releases the brake pedal again, the driver assistance system may in accordance with another advantageous feature of the present invention be configured to automatically assume the deceleration operation again. Thus, the driver assistance system continues a deceleration of the vehicle in accordance with the previously executed deceleration characteristic. It may also be conceivable, following an active decrease of the actual speed by the driver through actuation of the brake pedal, to select a slightly different characteristic when the selection of the deceleration characteristic is dependent on the actual speed.

According to another advantageous feature of the present invention, the driver assistance system can include an operator control element by which a speed control of the motor vehicle is controllable and which, when actuated, effects an acceleration of the motor vehicle to at most the limit speed, and, when released, enables the driver assistance system to automatically assume the deceleration operation as a function of the deceleration characteristic. Advantageously, the operator control element is configured as a lever which is actuated when moved in one direction and released when moved in another direction opposite to the one direction. The provision of the operator control element thus allows manual operation of the driver assistance system so that the driver is not compelled to only use the accelerator pedal in order to trigger or provide the activation signal. Operation of the driver assistance system using the accelerator pedal takes however precedence over manual operation of the operator control element. When the driver assistance system is ready for operation, the driver is able to accelerate the vehicle through actuation of the lever so long as the actual speed is below the limit speed. Acceleration is possible up to the limit speed at a maximum. When the driver releases the operator control element, the driver assistance system becomes effective and assumes the speed control by changing from the preceding acceleration mode to the deceleration mode to automatically decelerate the vehicle in accordance with the deceleration characteristic. This change to the deceleration mode is not only possible when releasing the operator control element but also when moving the operator control element in opposite direction. This change in direction is then used as the signal for the driver assistance system to assume the deceleration operation.

According to another advantageous feature of the present invention, the driver assistance system can remain operative as long as an actual speed ranges between 0 km/h and the limit speed. When the driver accelerates by depressing the accelerator pedal to a speed above the limit speed, the driver assistance system is automatically deactivated. The driver is forced to switch on the driver assistance system to render it operational when the vehicle travels at limit speed or below. In other words, the driver assistance system switches off automatically at a speed above the limit speed.

Even though, as described above, the selection of a deceleration characteristic from an array of characteristics is possible automatically in dependence on certain constraints, it is, of course, also conceivable to have the driver select the desired deceleration characteristic. The driver has for example the option to choose between a "comfortable" and a "dynamic" characteristic as basis for the deceleration mode.

At standstill, the driver assistance system has a standstill management, which means that the hydraulic hold at stoppage is maintained, for example at significant inclines or with trailer load. The presence of the driver is hereby monitored and a secure state can optionally be implemented, for example by activating the parking brake or engaging the P gear mode. While the driver assistance system can generally also be switched off when engaging an invalid gear (e.g. shifting into N) during travel, a previously started automatic deceleration, as initiated by the driver assistance system, is completed for safety reasons when the driver assistance system still operates the deceleration mode at the time of switch off. The respective operating state of the driver assistance system, i.e. whether ready for operation or activated, can be visually indicated to the driver using a suitable display instrument.

According to another advantageous feature of the present invention, different deceleration characteristics can be used at deceleration during forward travel and during backing up. When backing up, normally during a parking maneuver, it may oftentimes be necessary to stop the vehicle slight faster because of the tight space of the parking spot or the like, compared to a forward travel. In this case, a deceleration characteristic can be selected which causes a very rapid braking as soon as the driver releases the accelerator pedal either completely or fast enough to establish a significant release gradient. The driver assistance system assists the driver in these critical maneuvers that require a rapid change from gas pedal to brake pedal even before the driver steps on the brake pedal, i.e. during change from accelerator pedal to brake pedal. As the driver is in a position at any time to override the automatic deceleration, triggered by the driver assistance system, through actuation of the brake pedal, the actions by the driver take precedence also during parking while the driver assistance system still assists the driver by the automatic deceleration, when triggering the activation signal (i.e. sufficiently quick release of pedal).

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 is a principal illustration of a motor vehicle with driver assistance system in accordance with the present invention.

DETAILED DESCRIPTION OF PREFERRED EMBODIMENTS

The depicted embodiment is to be understood as illustrative of the invention and not as limiting in any way. It should also be understood that the FIGURE is not necessarily to scale and that the embodiment is sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a principal illustration of a motor vehicle in accordance with the present invention, generally designated by reference numeral 1. The motor vehicle 1 includes an accelerator pedal 2 and a brake pedal 3, which are connected to one another, by way of example, by a vehicle bus 4 so that respective operating information to these pedals 2, 3 can be detected and transmitted to a control device 5. The control device 5 further receives information from a speed detector 6 so that the actual speed $v_{ist}$ of the motor vehicle 1 is known by the control device 5 at all times.

Operably connected to the control device 5 is an operator control element 7 in the form of a lever which can be toggled manually by the driver. The control device 5 and the operating lever 7 are part of a driver assistance system, generally designated by reference numeral 8. The driver assistance system 8 provides speed control of the motor vehicle 1 while moving forward or backing up and automatically brings the motor vehicle 1 to a stop according to a predefined deceleration characteristic while moving forward or backing up, without participation of the driver and without the need for the control device 5 to consider any signal of an environmental sensor. The driver assistance system 8 thus operates as a virtually closed system without information about any features in the surroundings of the motor vehicle 1, such as distance to obstacles, speeds of other vehicles, or the like.

The driver assistance system 8 can basically be switched on or off by a switch 9 and rendered operative only below a limit speed $v_g$ in the presence of required constraints. The limit speed may be for example maximal 40 km/h, and can be set by the manufacturer or set by the driver. In the latter case, a maximum upper limit is predefined for the limit speed that can be set by the driver. In any event, the limit speed is markedly below the maximal travel speed of the motor vehicle 1, which maximal travel speed is dependent on the engine (not shown).

When the driver has rendered the driver assistance system 8 operative using the on/off switch 9, and the speed detector 6 indicates an actual speed $v_{ist}$ that is smaller or equal to the limit speed $v_g$, the driver assistance system 8 is able to assume the speed control. When the driver quickly releases the accelerator pedal 2, after having slightly depressed it beforehand to accelerate the vehicle, or the accelerator pedal 2 assumes a predefined position, i.e. an absolute value to trigger operation of the driver assistance system 8, the driver assistance system 8 causes the motor vehicle 1 to operate in a deceleration mode. The control device 5 then bases the further control mode on a deceleration characteristic 10 which is only suggested in FIG. 1 by way of a diagram plotting the speed on the abscissa as a function of the deceleration (i.e. acceleration) on the ordinate. In accordance with this deceleration characteristic 10, the control device 5 controls the brake system (not shown in greater detail) accordingly so that the motor vehicle 1 in accordance with the specification of the deceleration characteristic 10 comes automatically to a halt. The sole action triggering this event is the actuation of the accelerator pedal 2, causing a processing of the deceleration characteristic 10. The vehicle 1, after coming to a standstill, is held firmly in this state, for example by engaging the parking brake or the P gear mode, again controlled by the control device 5.

During automatic deceleration mode, applicable in forward travel mode or backward driving mode, the driver is able to maintain command of the vehicle 1 by actively accelerating the vehicle 1 via the accelerator pedal 2 or by actively depressing the brake pedal 3 to slow down the vehicle 1. The driver is thus in a position to assume the speed control at all times in view of the prioritization of actuation of the accelerator and brake pedals. In such a case, the driver assistance system 8 immediately takes over speed control and continues a previously started deceleration according to the characteristic 10, when the brake pedal 3 is depressed even only briefly and released again. Immediately thereafter, the driver assistance system 8 continues again the speed control in accordance with the deceleration characteristic 10 commensurate with the actual speed at this point.

When the driver accelerates the vehicle 1 by depressing the accelerator pedal 2, the vehicle 1 may exceed the limit speed $v_g$. As a result, the driver assistance system 8 changes to standby mode as the conditions for its activation and its active intervention as far as speed is concerned no longer exist. Only when the vehicle 1 slows down and the actual speed $v_{ist}$ falls below the limit speed $v_g$, does the driver assistance system 8 assume the speed control so long as the respective triggering constraint (e.g. sufficiently quick release of the accelerator pedal 2) is present.

The driver is also able to assume the speed control, using the operator control element 7. By actuating the operator control element 7, the driver is able to accelerate the vehicle 1 for example. This is possible however only as long as the actual speed $v_{ist}$ is smaller than the limit speed $v_g$. Acceleration is possible only until reaching the limit speed $v_g$. The vehicle 1 then cruises at this speed, even when the driver continues to actuate the operator control element 7. However, when the driver releases the operator control element 7, this event is interpreted as an indication for the driver assistance system 8 to take over the automatic deceleration operation according to the characteristic 10.

The deceleration characteristic 10 can be predefined. It is, however, also conceivable to select the deceleration characteristic from an array of characteristics in dependency on a given actual speed at which for example the driver assistance system 8 is rendered active via the accelerator pedal 2 to assume the speed control. When the actual speed $v_{ist}$ approaches the limit speed $v_g$, a steeper deceleration characteristic may be chosen to slow down the vehicle 1 relatively quickly and then to decelerate gently and gradually until coming to a halt, as compared to a scenario in which an actual speed $v_{ist}$ is only half the limit speed $v_g$, for example. In that case, a deceleration characteristic may, for example, be chosen which is relatively flat.

There is also the possibility to have the driver select the deceleration characteristic to be executed, i.e. the deceleration mode can be chosen by the driver through selection of a respective deceleration characteristic. The driver may choose between a comfortable deceleration mode which involves fairly slow deceleration and a dynamic deceleration mode which involves a relatively sudden and intense braking action.

The driver assistance system 8 remains basically operative, i.e. assumes a standby mode, once initiated, as long as the actual speed $v_{ist}$ is between 0 km/h and the limit speed $v_g$. In other words, once initiated via the on/off switch 9, the driver assistance system 8 remains operative as soon as the actual speed $v_{ist}$ is within the stated speed range. Upon receiving a triggering signal, the driver assistance system 8 immediately assumes the speed control. When the actual speed $v_{ist}$ exceeds the limit speed $v_g$, the driver assistance system 8 changes to standby mode and is no longer capable to assume the speed control, even when the driver very quickly releases the accelerator pedal 2. The driver assistance system 8 can only take over the speed control when the actual speed $v_{ist}$ drops sufficiently and the accelerator pedal 2 is released to trigger operation of the driver assistance system 8.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A motor vehicle, comprising:
an on/off switch actuated by a driver during operation of the vehicle by the driver; and
a driver assistance system assisting a driver during operation of the vehicle by the driver and being rendered operative when the driver actuates the on/off switch by using the on/off switch during operation of the vehicle and the motor vehicle travels below a limit speed to automatically brake the motor vehicle to a halt while moving forward or backing up a function of a deceleration characteristic;
wherein the deceleration characteristic is selected from an array of deceleration characteristics dependent on an operating behavior of an accelerator pedal.

2. The motor vehicle of claim 1, wherein the deceleration characteristic is predefined.

3. The motor vehicle of claim 1, wherein the deceleration characteristic is selected as a function of an actual speed.

4. The motor vehicle of claim 1, wherein the driver assistance system is configured to be subordinated to a driver-side actuation of a brake pedal, even when activated.

5. The motor vehicle of claim 4, wherein the driver assistance system is configured to automatically assume deceleration operation, when the brake pedal is released and the motor vehicle travels below the limit speed.

6. The motor vehicle of claim 1, wherein the driver assistance system includes an operator control element by which a speed control of the motor vehicle is controllable and which, when actuated, effects an acceleration of the motor vehicle to a speed not exceeding the limit speed, and, when released, enables the driver assistance system to automatically assume the deceleration operation as a function of the deceleration characteristic.

7. The motor vehicle of claim 6, wherein the operator control element is configured as a lever.

8. The motor vehicle of claim 7, wherein the lever is actuated when moved in one direction and released when moved in another direction opposite to the one direction.

9. The motor vehicle of claim 1, wherein the driver assistance system remains operative as long as an actual speed ranges between 0 km/h and the limit speed.

10. The motor vehicle of claim 1, wherein a deceleration behavior is selectable by a driver.

11. The motor vehicle of claim 1, wherein one deceleration characteristic is used at deceleration during forward travel and another deceleration characteristic is used at deceleration when backing up.

* * * * *